United States Patent
Shibata et al.

(10) Patent No.: US 8,832,335 B2
(45) Date of Patent: Sep. 9, 2014

(54) CONTROL DEVICE AND COMPUTER PROGRAM PRODUCT

(75) Inventors: Akihiro Shibata, Tokyo (JP); Koichi Fujisaki, Kanagawa (JP); Tetsuro Kimura, Tokyo (JP); Tatsunori Kanai, Kanagawa (JP); Haruhiko Toyama, Kanagawa (JP); Satoshi Shirai, Kanagawa (JP); Masaya Tarui, Kanagawa (JP); Hiroyoshi Haruki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 13/334,235

(22) Filed: Dec. 22, 2011

(65) Prior Publication Data
US 2012/0246356 A1 Sep. 27, 2012

(30) Foreign Application Priority Data
Mar. 24, 2011 (JP) ................................ 2011-065705

(51) Int. Cl.
G06F 3/00 (2006.01)
G06F 5/00 (2006.01)
G06F 1/32 (2006.01)
G06F 9/48 (2006.01)

(52) U.S. Cl.
CPC ............ *G06F 1/3243* (2013.01); *G06F 9/4812* (2013.01); *Y02B 60/144* (2013.01)
USPC ................................ 710/48; 710/58; 710/16

(58) Field of Classification Search
None
See application file for complete search history.

(56) References Cited

U.S. PATENT DOCUMENTS

2004/0193817 A1* 9/2004 Hotaka ......................... 711/163

2005/0283556 A1* 12/2005 Parekh ......................... 710/260

FOREIGN PATENT DOCUMENTS

JP 2010-092474 4/2010

OTHER PUBLICATIONS

Technical Reference Manual, Chapter 12, "Power Management", ARM926EJ-S, 2001-2008, pp. 12-1-12-4.
Use Cases and Measurement Results, i.MX51 EVK Supply Current Measurements, Chapter 3, pp. 5-8, May 2010.
English Translation of Japanese Office Action of Notification of Rejection for Application No. 2011-065705 Dated Feb. 12, 2013.
Office Action for Taiwanese Patent Application No. 101108166 Dated May 20, 2014, 9 pgs.
Notification of the First Office Action for Chinese Patent Application No. 201210080334.5 Dated Jun. 17, 2014, 24 pgs.

* cited by examiner

*Primary Examiner* — Zachary K Huson
(74) *Attorney, Agent, or Firm* — Amin, Turocy & Watson, LLP (57) ABSTRACT

According to an embodiment, a control device includes a receiving unit configured to receive an interrupt request requesting an interrupt process to be executed by a processing device that executes one or more processes; a storage unit configured to store therein the interrupt request; a determining unit configured to determine a state of the processing device; a sending unit configured to send the interrupt request to the processing device; and a control unit configured to store the interrupt request received by the receiving unit in the storage unit when the processing device is determined by the determining unit to be in an idle state in which the processing device is not executing the processes and a predetermined condition is not satisfied, and to control the sending unit to send the interrupt request stored in the storage unit to the processing device when the predetermined condition is satisfied.

4 Claims, 7 Drawing Sheets

CONTROL DEVICE AND COMPUTER PROGRAM PRODUCT

CROSS-REFERENCE TO RELATED APPLICATION(S)

This application is based upon and claims the benefit of priority from Japanese Patent Application No. 2011-065705, filed on Mar. 24, 2011; the entire contents of which are incorporated herein by reference.

FIELD

Embodiments described herein relate generally to a control device and a computer program product.

BACKGROUND

A technique of making a processing device (such as a microprocessor) capable of executing one or more processes execute an interrupt process each time the interrupt process is caused is conventionally known. In such a technique, if an interrupt process is caused when the microprocessor is in an idle state in which the microprocessor is not executing any processes, the microprocessor changes from the idle state to an active state in which the microprocessor executes the interrupt process. The microprocessor then changes to the idle state again after executing the interrupt process.

In this case, power is consumed when the microprocessor changes from the idle state to the active state or from the active state to the idle state because processing associated with the state change is caused. Therefore, the technique of making a processor execute an interrupt process each time the interrupt process is caused is disadvantageous in increased power consumption because the number of state changes of the microprocessor is large.

DETAILED DESCRIPTION

According to an embodiment, a control device includes a receiving unit configured to receive an interrupt request requesting an interrupt process, to be executed by a processing device that executes one or more processes; a storage unit configured to store therein the interrupt request; a determining unit configured to determine a state of the processing device; a sending unit configured to send the interrupt request to the processing device; and a control unit configured, when the processing device is determined to be in an idle state by the determining unit and a predetermined condition is not satisfied, to store the interrupt request received by the receiving unit in the storage unit, the idle state being a state in which the processing device is not executing the processes; and, when the predetermined condition is satisfied, to control the sending unit to send the interrupt request stored in the storage unit to the processing device.

Various embodiments will be described hereinafter with reference to the accompanying drawings.

First Embodiment

Figure 1:
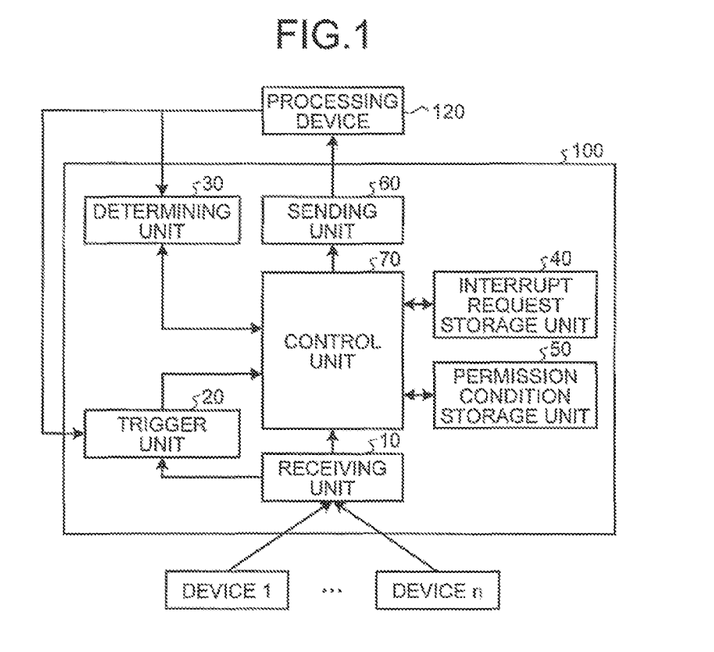
FIG. 1 is a block diagram illustrating an example of a control device according to a first embodiment.

FIG. 1 is a block diagram illustrating an example of a schematic configuration of a control device 100 according to a first embodiment. The control device 100 receives from each of a plurality of devices (device 1 to device n) a request (referred to as an "interrupt request") for an interrupt process by the device, and decides whether or not to send the received interrupt request to a processing device 120 that executes one or more processes. The processing device 120 may be a central processing unit (CPU), for example. In this embodiment, the control device 100 sends the received interrupt request to the processing device 120 if the processing device 120 is in an active state in which the processing device 120 is executing a process or sends the received interrupt request to the processing device 120 only when a predetermined condition is satisfied if the processing device 120 is in an idle state in which the processing device 120 is not executing any processes. Specific details will be hereinafter described.

As illustrated in FIG. 1, the control device 100 includes a receiving unit 10, a trigger unit 20, a determining unit 30, an interrupt request storage unit 40, a permission condition storage unit 50, a sending unit 60 and a control unit 70. The respective components (10, 20, 30, 40, 50, 60 and 70) of the control device 100 herein are constituted by semiconductor integrated circuits.

Figure 2:
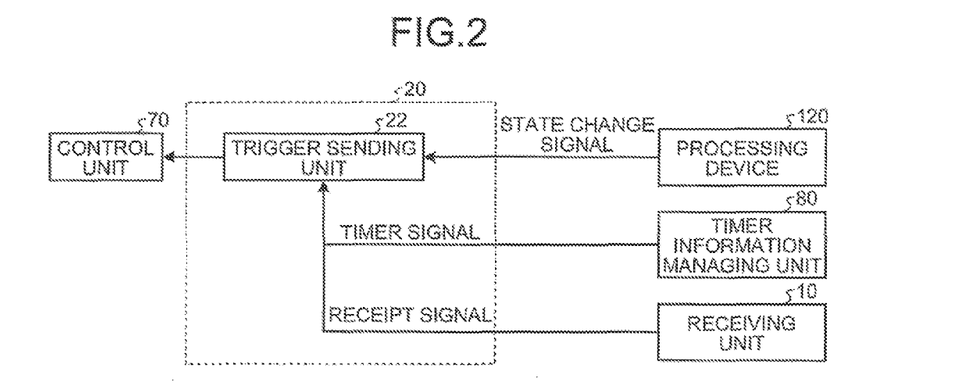
FIG. 2 is a block diagram illustrating an example of a trigger unit.

The receiving unit 10 receives an interrupt request from each of a plurality of devices (device 1 to device n). The trigger unit 20 activates the control unit 70 when a certain condition is satisfied. FIG. 2 is a block diagram illustrating an example of a configuration of the trigger unit 20. As illustrated in FIG. 2, the trigger unit 20 includes a trigger sending unit 22. The trigger sending unit 22 sends a trigger signal for activating the control unit 70 to the control unit 70 when the trigger sending unit 22 is notified of a change in the state of the processing device 120 by the processing device 120. The processing device 120 notifies the trigger sending unit 22 of a state change signal for informing a state change when the processing device 120 changes from the active state to the idle state or from the idle state to the active state.

The trigger sending unit 22 also sends a trigger signal to the control unit 70 each time a time indicated by timer information indicating at least one time is reached. The timer information is stored in a memory (not illustrated) included in an external timer information managing unit 80. The timer information managing unit 80 notifies the trigger sending unit 22 of a timer signal for informing that the time is reached each time the time indicated by the timer information is reached.

The trigger sending unit 22 further sends a trigger signal to the control unit 70 when the trigger sending unit 22 is notified of receipt of an interrupt request by the receiving unit 10. The receiving unit 10 notifies the trigger sending unit 22 of a receipt signal for informing receipt of an interrupt request when the receiving unit 10 receives an interrupt request from each device (device 1 to device n). In this manner, the trigger unit 20 according to this embodiment activates the control unit 70, which is triggered when a state change signal is received from the processing device 120, when a timer signal is received from the timer information managing unit 80 or when a receipt signal is received from the receiving unit 10.

Figure 3:
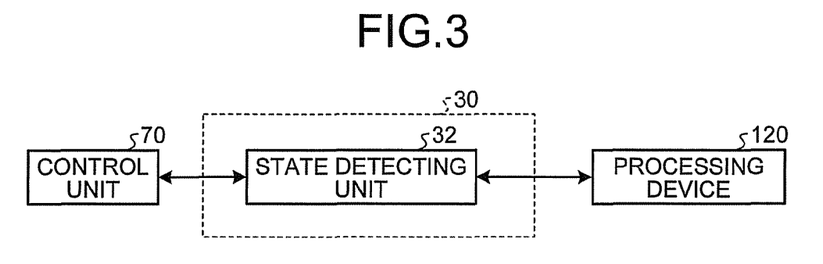
FIG. 3 is a block diagram illustrating an example of a determining unit.

The description is continued referring back to FIG. 1. The determining unit 30 determines whether the processing device 120 is in the active state or the idle state. The determining unit 30 may include a state detecting unit 32 as illustrated in FIG. 3, for example. In the example of FIG. 3, the state detecting unit 32 detects (determines) whether the processing device 120 is in the active state or the idle state by accessing the processing device 120 in response to a request from the control unit 70 (which will be described later).

Figure 4:
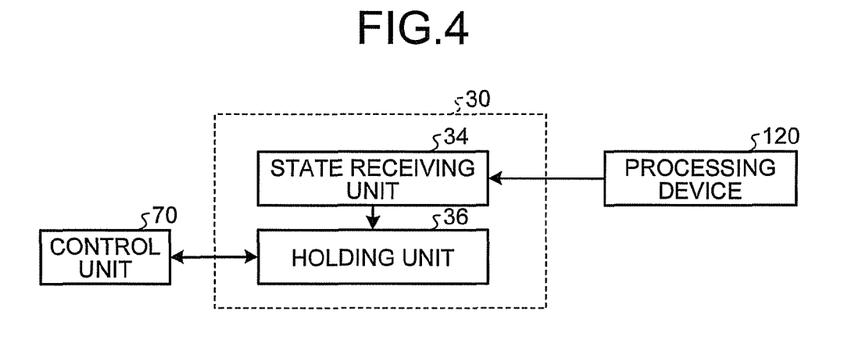
FIG. 4 is a block diagram illustrating an example of the determining unit.

Alternatively, the determining unit 30 may include a state receiving unit 34 and a holding unit 36 as illustrated in FIG. 4, for example. In the example of FIG. 4, the processing device 120 sends a state change signal for informing a state change to the state receiving unit 34 when the processing device 120 changes from the active state to the idle state or from the idle state to the active state. The state receiving unit 34 determines whether the processing device 120 is in the active state or the idle state based on the state change signal received from the processing device 120. The state receiving unit 34 then makes the holding unit 36 hold state information indicating the state (active state or idle state) of the processing device 120. The state information held by the holding unit 36 is updated each time the state receiving unit 34 receives the state change signal described above. As will be described later, the control unit 70 can know the state of the processing device 120 by reading out the state information held by the holding unit 36.

Figure 5:
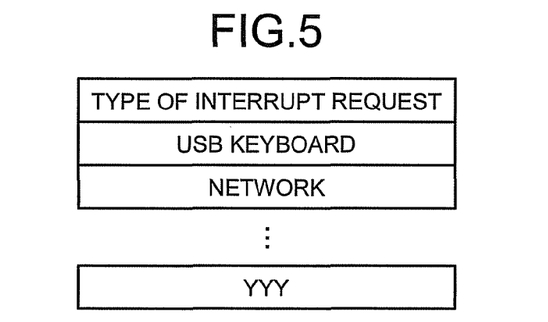
FIG. 5 is a diagram illustrating an example of information stored in an interrupt request storage unit.
Figure 6:
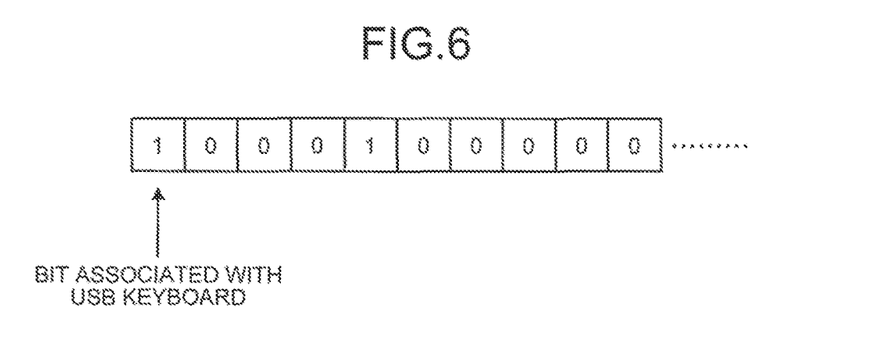
FIG. 6 is a diagram illustrating an example of the information stored in the interrupt request storage unit.

The description is continued referring back to FIG. 1. The interrupt request storage unit 40 stores therein the interrupt request received by the receiving unit 10. FIG. 5 is a diagram illustrating an example of information stored in the interrupt request storage unit 40. In the example of FIG. 5, "USB KEYBOARD" refers to an interrupt request caused by an input to a USB keyboard, "NETWORK" refers to an interrupt request caused by packet transmission/reception from/to a network interface device. Alternatively, the interrupt request storage unit 40 can store therein bits associated with the respective devices as illustrated in FIG. 6, for example. For example, when a bit associated with the "USB KEYBOARD" is "1", this means that an interrupt request caused by an input to the USB keyboard is held by the interrupt request storage unit 40. Basically, the interrupt request storage unit 40 may be in any form that stores therein information for identifying interrupt requests.

Figure 7:
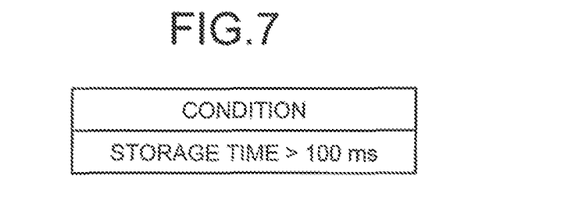
FIG. 7 is a diagram illustrating an example of a permission condition stored in a permission condition storage unit.

The permission condition storage unit 50 in FIG. 1 stores therein a permission condition indicating a condition under which sending of an interrupt request is permitted. FIG. 7 illustrates an example of the permission condition stored in the permission condition storage unit 50. In the example of FIG. 7, the permission condition is that a storage time representing a length of time for which an interrupt request is kept stored in the interrupt request storage unit 40 exceeds 100 ms. In the example of FIG. 7, if a plurality of interrupt requests are stored in the interrupt request storage unit 40, the permission condition is satisfied at a point when the storage time of the first stored interrupt request exceeds 100 ms.

Figure 8:
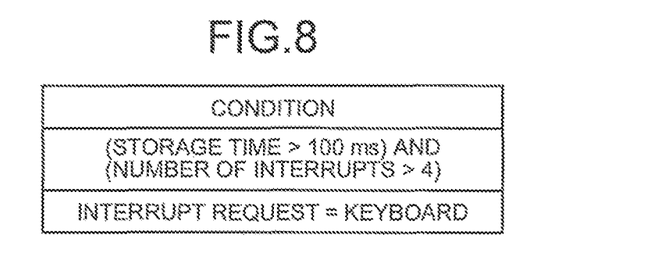
FIG. 8 is a diagram illustrating an example of the permission condition stored in the permission condition storage unit.

Note that the permission condition is not limited thereto, and any type of permission condition may be stored in the permission condition storage unit 50. For example, the permission condition storage unit 50 may store therein a permission condition of FIG. 8. In the example of FIG. 8, the permission condition storage unit 50 stores therein two conditions, and the permission condition is satisfied if either one of the two conditions is satisfied. In other words, whether the permission condition is satisfied or not is determined based on a logical sum of the two conditions. Note that the determination of the permission condition is not limited thereto, and whether the permission condition is satisfied or not may alternatively be determined based on a logical AND of two conditions, for example. Any number and any types of conditions may be used to obtain a logical sum or a logical AND. In the example of FIG. 8, the upper condition is that the storage time exceeds 100 ms and, at the same time, the number of interrupt requests stored in the interrupt request storage unit 40 is more than four. On the other hand, the lower condition is that an interrupt request caused by an input to a keyboard is stored in the interrupt request storage unit 40.

The sending unit 60 in FIG. 1 sends an interrupt request received by the receiving unit 10 and an interrupt request stored by the interrupt request storage unit 40 to the processing device 120 under the control of the control unit 70. Details thereof will be described later.

The control unit 70 initiates operation upon receipt of the trigger signal described above. The control unit 70 performs a deciding process of deciding whether or not to send an interrupt request to the processing device 120.

Figure 9:
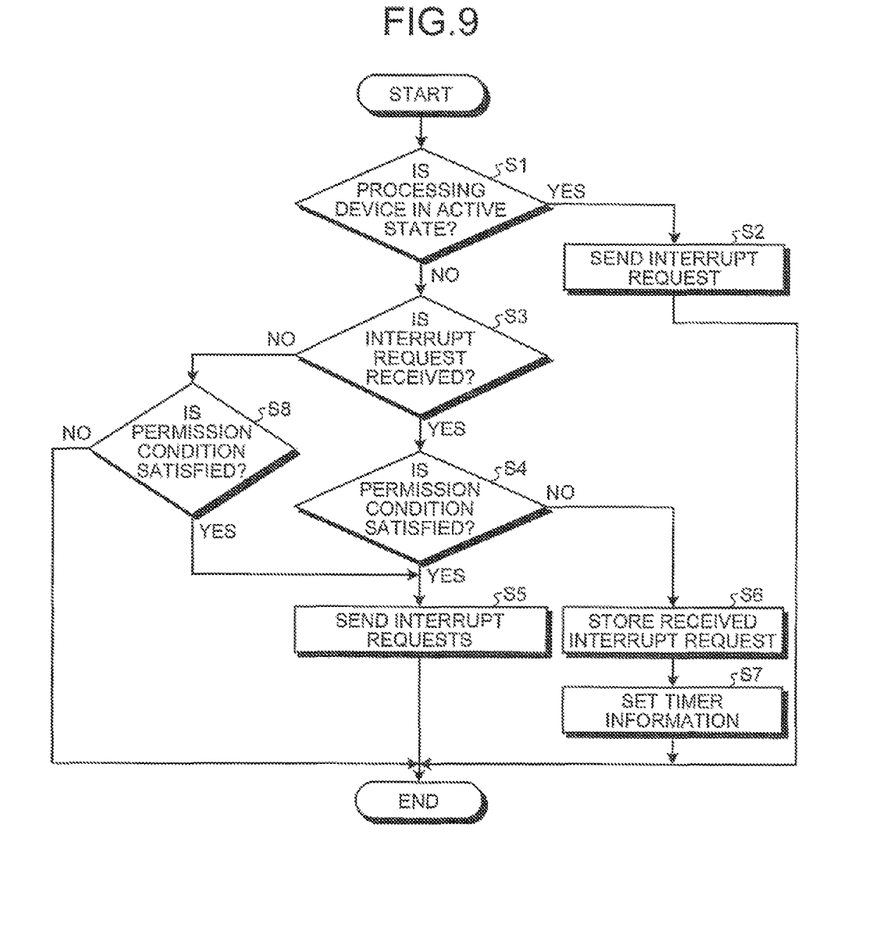
FIG. 9 is a flowchart illustrating an example of a deciding process performed by a control unit.

FIG. 9 is a flowchart illustrating an example of the deciding process performed by the control unit 70. First, the control unit 70 determines whether or not the processing device 120 is in the active state (step S1). More specifically, the determination is made as follows. When the determining unit 30 has the configuration of FIG. 3, the control unit 70 requests the state detecting unit 32 to notify the state of the processing device 120. The state detecting unit 32 that have received the request accesses the processing device 120 to detect the state of the processing device 120 and notifies the control unit 70 of the detection result. The control unit 70 determines whether or not the processing device 120 is in the active state based on the detection result notified by the state detecting unit 32. Alternatively, when the determining unit 30 has the configuration of FIG. 4, the control unit 70 reads out state information held by the holding unit 36, and determines whether or not the processing device 120 is in the active state based on the read state information.

If the result of step S1 is positive (if the processing device 120 is determined to be in the active state), the control unit 70 controls the sending unit 60 to send an interrupt request stored in the interrupt request storage unit 40 to the processing device 120 (step S2). If the control unit 70 initiates operation which is triggered by receipt of an interrupt request by the receiving unit 10, the control unit 70 controls the sending unit 60 to send the received interrupt request to the processing device 120. Then, the deciding process is ended and the operation of the control unit 70 is stopped.

If the result of step S1 is negative (if the processing device 120 is determined to be in the idle state), the control unit 70 checks whether the initiation of the operation is triggered by receipt of an interrupt request by the receiving unit 10. In other words, the control unit 70 checks whether or not an interrupt request is received by the receiving unit 10 (step S3).

If the result of step S3 is positive, the control unit 70 refers to the permission condition stored in the permission condition storage unit 50 and determines whether the permission condition is satisfied (step S4). In this embodiment, it is assumed that the permission condition storage unit 50 stores therein the permission condition illustrated in FIG. 7. If the result of step S4 is positive, the control unit 70 controls the sending unit 60 to send the interrupt request stored in the interrupt request storage unit 40 and the interrupt request received by the receiving unit 10 to the processing device 120 (step S5). Then, the deciding process is ended and the operation of the control unit 70 is stopped.

If the result of step S4 described above is negative, the control unit 70 stores the interrupt request received by the receiving unit 10 in the interrupt request storage unit 40 (step S6), and start measuring the storage time of the stored interrupt request. Note that although it is determined whether or not the permission condition is satisfied without storing the interrupt request received by the receiving unit 10 in the interrupt request storage unit 40 in step S4, the operation is not limited thereto. It may alternatively be determined whether or not the permission condition is satisfied after the interrupt request received by the receiving unit 10 is stored in the interrupt request storage unit 40.

Then, the control unit 70 sets timer information according to a result of comparison between a time when the storage time of the first interrupt request stored in the interrupt request storage unit 40 exceeds 100 ms (a time when the permission condition in FIG. 7 is satisfied) and the next time indicated by the timer information (step S7). More specifically, the control unit 70 sets the time when the storage time of the interrupt request exceeds 100 ms as the next time to be indicated by the timer information if the time when the storage time of the interrupt request exceeds 100 ms is earlier than the next time indicated by the timer information. The control unit 70 then notifies the timer information managing unit 80 of the set timer information. As a result, when the next time indicated by the timer information is reached, the permission condition will be satisfied at the same time. When step S7 is completed, the deciding process is ended and the operation of the control unit 70 is stopped.

On the other hand, if the result of step S3 described above is negative, the control unit 70 also determines whether or not the permission condition is satisfied (step S8). Then, if the result of step S8 is positive, the process proceeds to step S5 described above. If the result of step S8 is negative, the deciding process is ended and the operation of the control unit 70 is stopped.

As described above, when the processing device 120 is in the idle state, the control device 100 according to this embodiment stores interrupt requests received from the respective devices in the interrupt request storage unit 40 until a predetermined condition is satisfied, and when the predetermined condition is satisfied (the permission condition described above is satisfied or the processing device 120 changes to the active state), the control device 100 sends the interrupt requests stored in the interrupt request storage unit 40 and the interrupt requests received by the receiving unit 10 all together to the processing device 120. The processing device 120 that has received a plurality of interrupt requests changes from the idle state to the active state and continuously executes a plurality of interrupt processes. Thus, according to this embodiment, the idle time is extended (longer). Therefore, an advantageous effect that the average power consumption of the processing device 120 can be reduced can be achieved. Since the idle time can be extended even if only one interrupt request is stored in the interrupt request storage unit 40 when the predetermined condition is satisfied, the idle time is longer and thus an advantageous effect that the average power consumption can be reduced can be achieved even when a plurality of interrupt requests is not stored in the interrupt request storage unit 40.

Second Embodiment

A second embodiment is different from the first embodiment in that a permission condition that power supply condition of the processing device 120, the control device 100 and equipments on which the respective devices are mounted (for example, terminal equipments such as PCs) exceeds a threshold is employed. Specific details thereof will be hereinafter described. Parts that are the same as those in the first embodiment will be designated by the same reference numerals and description thereof will not be repeated as appropriate.

Figure 10:
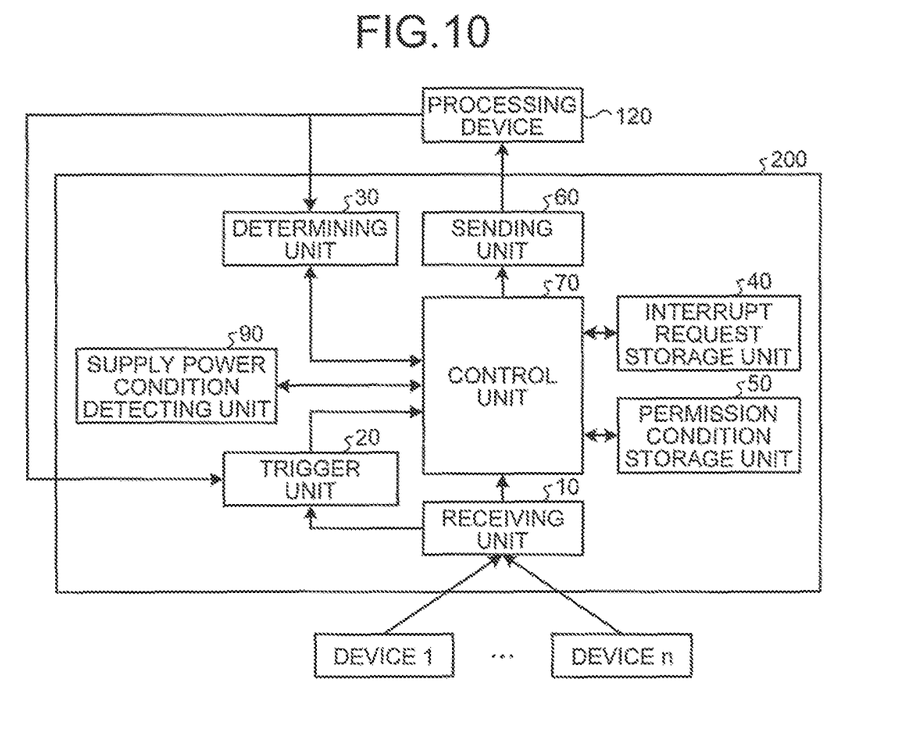
FIG. 10 is a block diagram illustrating an example of a control device according to a second embodiment.
Figure 11:
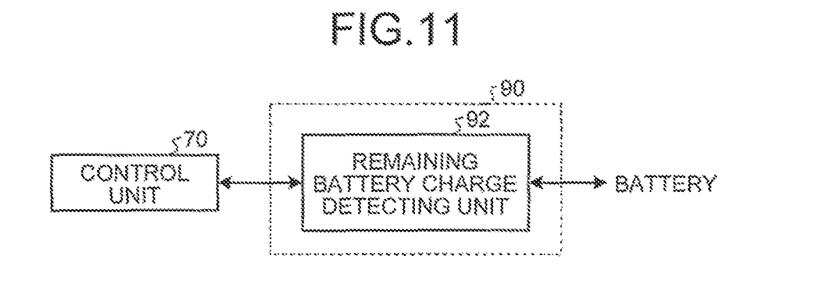
FIG. 11 is a block diagram illustrating an example of a power supply condition detecting unit.

FIG. 10 is a block diagram illustrating an example of a schematic configuration of a control device 200 according to the second embodiment. The control device 200 is different from the control device 100 in the first embodiment in that a power supply condition detecting unit 90 is further included. The power supply condition detecting unit 90 detects power supply condition of the equipments. In this embodiment, the power supply condition detecting unit 90 detects a total amount of charge (referred to as remaining battery charge) remaining in batteries that are power supplies of the equipments. For example, the power supply condition detecting unit 90 may include a remaining battery charge detecting unit 92 as illustrated in FIG. 11. In the example of FIG. 11, the remaining battery charge detecting unit 92 accesses batteries that are not illustrated to detect the remaining battery charge in response to a request from the control unit 70, and notifies the control unit 70 of the detected remaining battery charge.

Figure 12:
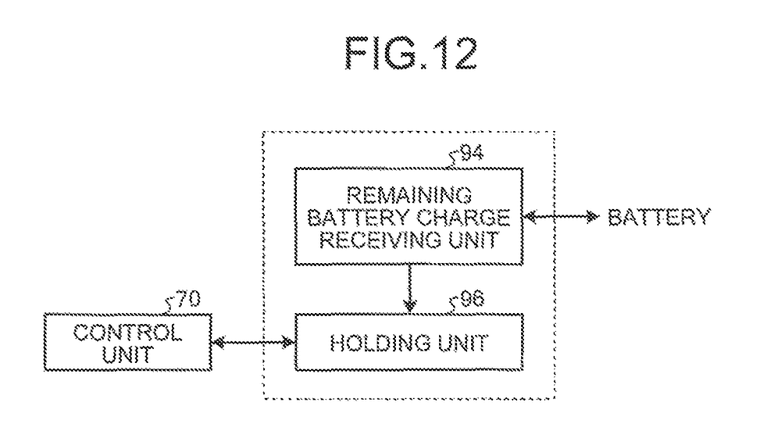
FIG. 12 is a block diagram illustrating an example of a Power supply condition detecting unit.

Alternatively, the power supply condition detecting unit 90 may include a remaining battery charge receiving unit 94 and a holding unit 96 as illustrated in FIG. 12, for example. In the example of FIG. 12, the remaining battery charge receiving unit 94 receives the remaining battery charge from batteries that are not illustrated, and makes the holding unit 96 hold the received remaining battery charge. The remaining battery charge held by the holding unit 96 is updated each time the remaining battery charge receiving unit 94 receives the remaining battery charge. The control unit 70 can know the remaining battery charge by reading out the remaining battery charge held by the holding unit 96.

Figure 13:
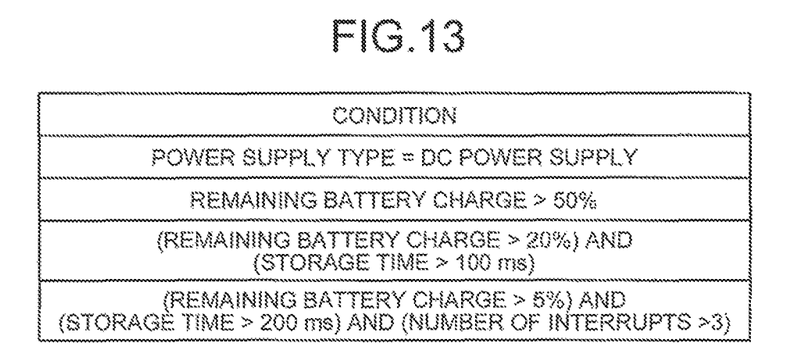
FIG. 13 is a diagram illustrating an example of a permission condition stored in a permission condition storage unit.

FIG. 13 is a diagram illustrating an example of a permission condition stored in the permission condition storage unit 50 in the second embodiment. In the example of FIG. 13, the permission condition storage unit 50 stores therein four conditions, and the permission condition is satisfied if any one of the four conditions is satisfied. In the example of FIG. 13, a condition in the first row is that the type of power supply is a DC power supply (direct current power supply). A condition in the second row is that the remaining battery charge is over 50%. A condition in the third row is that the remaining battery charge is over 20% and, at the same time, the storage time exceeds 100 ms. A condition in the fourth row is that the remaining battery charge is over 5%, the storage time exceeds 200 ms and the number of interrupt requests stored in the interrupt request storage unit 40 is more than three.

Next, the deciding process performed by the control unit 70 will be described with reference to FIG. 9. When the power supply condition detecting unit 90 has the configuration of FIG. 11, the control unit 70 requests the power supply condition detecting unit 90 to notify the remaining battery charge in each of step S4 and step S8 in FIG. 9. The remaining battery charge detecting unit 92 that has received the request accesses the batteries that are not illustrated to detect the remaining battery charge, and notifies the control unit 70 of the detected remaining battery charge. The control unit 70 determines whether or not the permission condition stored in the permission condition storage unit 50 is satisfied based on the remaining battery charge notified by the remaining battery charge detecting unit 92, the storage time of the interrupt requests stored in the interrupt request storage unit 40 and the number of interrupt requests.

Alternatively, when the power supply condition detecting unit 90 has the configuration of FIG. 12, the control unit 70 reads out the remaining battery charge held by the holding unit 96, and determines whether or not the permission condition stored in the permission condition storage unit 50 is satisfied based on the read remaining battery charge, the storage time of the interrupt requests stored in the interrupt request storage unit 40 and the number of the interrupt requests in each of step S4 and step S8 in FIG. 9. Since the other processes are similar to those in the first embodiment, detailed description thereof will not be repeated.

Also in this embodiment, when the processing device 120 is in the idle state, the control device 200 stores interrupt requests received from the respective devices in the interrupt request storage unit 40 until a predetermined condition is satisfied, and when the predetermined condition is satisfied, the control device 200 sends the interrupt requests stored in the interrupt request storage unit 40 and the interrupt requests received by the receiving unit 10 all together to the processing device 120. Therefore, an advantageous effect that the average power consumption of the processing device 120 can be reduced can be achieved.

First Modified Example

The permission condition stored in the permission condition storage unit 50 described above may be any condition. For example, a permission condition that the number of interrupt requests is two may be employed. Hereinafter, an example in which an interrupt request (referred to as a first interrupt request) is sent to the control device 100 of the first embodiment and then another interrupt request (referred to as a second interrupt request) is sent thereto in a state in which no interrupt request is present in the interrupt request storage unit 40 will be described (also refer to FIG. 9).

First, when the first interrupt request is received by the receiving unit 10, the control unit 70 initiates operation to perform the deciding process described above. At this time, the processing device 120 is assumed to be in the idle state. Accordingly, the result of step S1 in FIG. 9 is negative and the result of step S3 is positive. The process thus proceeds to step S4. At this point, since no interrupt request is stored in the interrupt request storage unit 40 and only the first interrupt request is received, the number of interrupt request is "1", and the aforementioned permission condition (the number of interrupt requests, is two) is not satisfied. The process thus proceeds to step S6. Note that when the processing device 120 is in the active state (when the result of step S1 in FIG. 9 is positive), the control unit 70 controls the sending unit 60 to send the first interrupt request to the processing device 120 (step S2 in FIG. 9).

In step S6, the control unit 70 stores the first interrupt request received by the receiving unit 10 in the interrupt request storage unit 40. In this example, the deciding process is ended and the operation of the control unit 70 is stopped without performing the process in step S7 in FIG. 9.

When the second interrupt request is received by the receiving unit 10 thereafter, the control unit 70 initiates operation to perform the deciding process described above. The processing device 120 is assumed to be in the idle state similarly to the above. Accordingly, the result of step S1 is negative, the result of step S3 is positive, and the process thus proceeds to step S4. At this point, since the first interrupt request is stored in the interrupt request storage unit 40 and the second interrupt request is received by the receiving unit 10, the number of interrupt requests is "2", which satisfies the aforementioned permission condition. Accordingly, the process proceeds to step S5 where the control unit 70 controls the sending unit 60 to send the received second interrupt request and the first interrupt request stored in the interrupt request storage unit 40 to the processing device 120. Note that also when the processing device 120 is in the active state (when the result of step S1 in FIG. 9 is positive), the control unit 70 controls the sending unit 60 to send the received second interrupt request and the first interrupt request stored in the interrupt request storage unit 40 to the processing device 120 (step S2 in FIG. 9).

Second Modified Example

For example, a storage time at which the permission condition is satisfied (referred to as a threshold time) may be set individually for each interrupt request. A case where a threshold time associated with an interrupt request 1 caused by an input to a keyboard is set to t1 and a threshold time associated with an interrupt request 2 caused by an input to a mouse is set to t2 (<t1) is assumed here. In this case, the permission condition is that a storage time of any one interrupt request stored in the interrupt request storage unit 40 exceeds the threshold time associated with the interrupt request.

Hereinafter, an example in which the aforementioned interrupt request 1 is sent to the control device 100 of the first embodiment and then the aforementioned interrupt request 2 is sent thereto in a state in which no interrupt request is present in the interrupt request storage unit 40 will be described (also refer to FIG. 9). First, when the interrupt request 1 is received by the receiving unit 10, the control device 100 initiates operation to perform the deciding process described above. At this time, the processing device 120 is assumed to be in the idle state. Accordingly, the result of step S1 in FIG. 9 is negative, the result of step S3 is positive, and the process thus proceeds to step S4. At this point, since no interrupt request is present in the interrupt request storage unit 40, the aforementioned permission condition is not satisfied, and the process thus proceeds to step S6. Note that when the processing device 120 is in the active state (when the result of step S1 in FIG. 9 is positive), the control unit 70 controls the sending unit 60 to send the received interrupt request 1 to the processing device 120 (step S2 in FIG. 9).

In step S6, the control unit 70 stores the interrupt request 1 received by the receiving unit 10 in the interrupt request storage unit 40. In this example, an interrupt request and a threshold time of the interrupt request are stored in association with each other in the interrupt request storage unit 40. Next, the control unit 70 sets timer information according to a result of comparison between a time when the storage time of the interrupt request 1 exceeds the threshold time t1 associated therewith and the next time indicated by the timer information (step S7). It is assumed here that the time at which the storage time of the interrupt request 1 exceeds the threshold time t1 associated therewith is earlier than the next time indicated by the timer information. Accordingly, the control unit 70 sets the time at which the storage time of the interrupt request 1 exceeds the threshold time t1 associated therewith, namely the time at which a length of time t1 has passed from the current time, is set as the next time to be indicated by the timer information. Then, the deciding process is ended and the operation of the control unit 70 is stopped.

When the interrupt request 2 is received by the receiving unit 10 thereafter, the control unit 70 initiates operation to perform the deciding process described above. The processing device 120 is assumed to be in the idle state similarly to the above. Accordingly, the result of step S1 is negative, the result of step S3 is positive, and the process thus proceeds to step S4. It is assumed here that the interrupt request 1 is stored in the interrupt request storage unit 40 and the storage time of the interrupt request 1 has not exceeded the threshold time t1 associated with the interrupt request 1. Accordingly, the permission condition is not satisfied and the process proceeds to step S6. Note that when the processing device 120 is in the active state (when the result of step S1 is positive), the control unit 70 controls the sending unit 60 to send the received interrupt request 2 and the interrupt request 1 stored in the interrupt request storage unit 40 to the processing device 120 (step S2 in FIG. 9).

Figure 14:
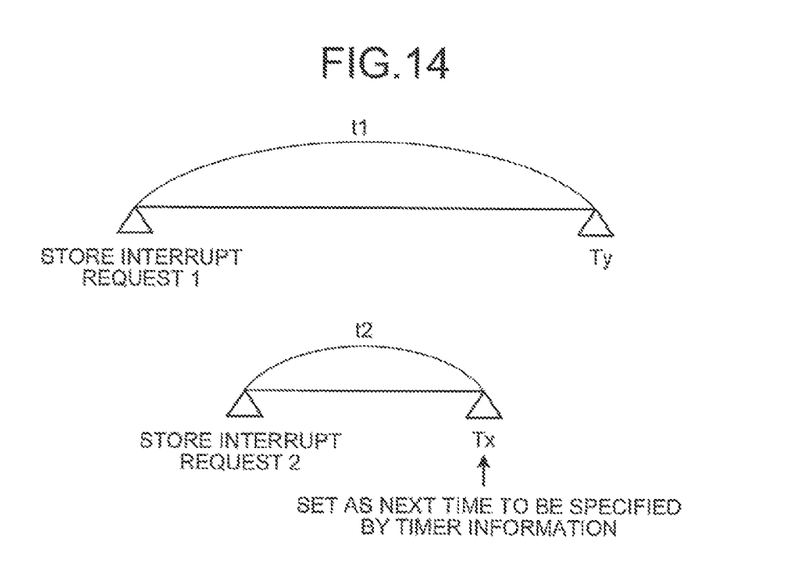
FIG. 14 is an explanatory diagram of a modified example.

In step S6, the control unit 70 stores the interrupt request 2 received by the receiving unit 10 in the interrupt request storage unit 40. Next, the control unit 70 sets timer information according to a result of comparison between a time when the storage time of the interrupt request 2 exceeds the threshold time t2 associated therewith and the next time indicated by the timer information, namely the time at which the storage time of the interrupt request 1 exceeds the threshold time t1 (step S7). It is assumed here that the time Tx at which the storage time of the interrupt request 2 exceeds the threshold time t2 is earlier than the time Ty at which the storage time of the interrupt request 1 exceeds the threshold time t1 as illustrated in FIG. 14. Therefore, the control unit 70 sets the time Tx illustrated in FIG. 14 as the next time to be indicated by the timer information. When the time Tx is reached thereafter, the permission condition will be satisfied at the same time.

Third Modified Example

While the permission condition is set by using the remaining battery charge in the second embodiment described above, the permission condition is not limited thereto. For example, if the power supplies for the equipments are solar cells or the like, the permission condition can be set by using the generated voltage, the generated current or the like of the solar cells. Basically, the permission condition may be any condition that power supply condition exceeds a threshold.

Fourth Modified Example

Figure 15:
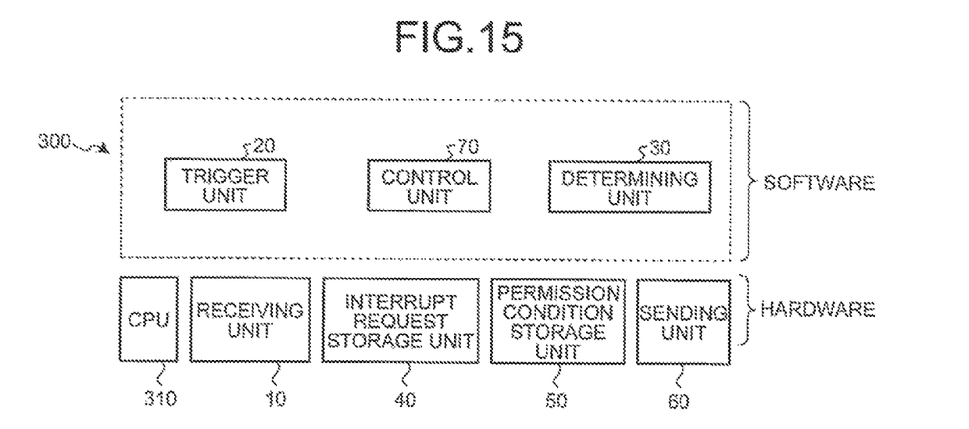
FIG. 15 is a block diagram illustrating an example of a control device according to a modified example.

While the respective components of the control device described above are constituted by semiconductor integrated circuits, the components are not limited thereto. Alternatively, some of the components may be implemented by software. For example, as illustrated in FIG. 15, hardware of a control device 300 may include a CPU 310, the receiving unit 10, the interrupt request storage unit 40, the permission condition storage unit 50 and the sending unit 60, and the functions of the trigger unit 20, the determining unit 30 and the control unit 70 may be implemented by executing control programs by the CPU 310.

Fifth Modified Example

While the timer information managing unit 80 is provided outside the control device, the timer information managing unit 80 is not limited thereto and may be mounted in the control device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
a receiving unit configured to receive an interrupt request requesting an interrupt process to be executed by a processing device that executes one or more processes;
a storage unit configured to store therein the interrupt request;
a determining unit configured to determine a state of the processing device;
a sending unit configured to send the interrupt request to the processing device; and
a control unit configured, when the processing device is determined to be in an idle state by the determining unit and a predetermined condition is not satisfied, to store the interrupt request received by the receiving unit in the storage unit, the idle state being a state in which the processing device is not executing the processes; and, when the predetermined condition is satisfied, to control the sending unit to send the interrupt request stored in the storage unit to the processing device, wherein
the predetermined condition comprises a storage time representing a length of time for which the interrupt request is kept stored in the storage unit exceeds a predetermined value, and
the control unit instructs the determining unit to determine the state of the processing device each time a time indicated by timer information indicating at least one time is reached, and when the processing device is determined by the determining unit to be in the idle state and the storage time is equal to or smaller than the predetermined value, changes next time to be indicated by the timer information according to a comparison result between a time at which the storage time exceeds the predetermined value and the next time indicated by the timer information.

2. The device according to claim 1, wherein the control unit sets the storage time at which the storage time exceeds the predetermined value as the next time to be indicated by the time information when the time at which the storage time exceeds the predetermined value is earlier than a next time that is indicated by the timer information.

3. The device according to claim 1, wherein
the storage unit stores therein the interrupt request in association with the predetermined value for each interrupt request, and
a second predetermined condition of the at least one predetermined conditions is that the storage time of the interrupt request exceeds the predetermined value associated with the interrupt request.

4. A non-transitory computer program product comprising a computer readable medium including programmed instructions, wherein the instructions, when executed by a computer, cause the computer to execute:
- receiving an interrupt request requesting an interrupt process to be executed by a processing device that executes one or more processes;
- determining a state of the processing device;
- storing the interrupt request in a storage unit when the processing device is determined in the determining to be in an idle state and a predetermined condition is not satisfied, the idle state being a state in which the processing device is not executing the processes; and
- sending the interrupt request stored in the storage unit to the processing device when the predetermined condition is satisfied, wherein
- the predetermined condition comprises a storage time representing a length of time for which the interrupt request is kept stored in the storage unit exceeds a predetermined value, and
- control is performed to determine the state of the processing device each time a time indicated by timer information indicating at least one time is reached, and when the processing device is determined to be in the idle state and the storage time is equal to or smaller than the predetermined value, next time to be indicated by the timer information is changed according to a comparison result between a time at which the storage time exceeds the predetermined value and the next time indicated by the timer information.

* * * * *